March 6, 1934. H. HASTINGS 1,950,141

TEMPERATURE INDICATING SYSTEM

Filed June 23, 1930

INVENTOR
HERBERT HASTINGS
BY
ATTORNEY

Patented Mar. 6, 1934

1,950,141

UNITED STATES PATENT OFFICE 1,950,141

TEMPERATURE INDICATING SYSTEM

Herbert Hastings, Brighton, N. Y.

Application June 23, 1930, Serial No. 463,159

5 Claims. (Cl. 73—118)

This invention relates to temperature indicating systems such as may be used in connection with internal combustion engines, electric transformers; in fact any service requiring a remote temperature indication of a cooling medium and the invention has for one of its objects to provide a thermoresponsive element with a suitable mounting with which it may be attached in such a manner that it will quickly respond to the temperature changes of the cooling medium.

Another object of this invention is to provide means whereby the movment of the thermoresponsive element may be quickly transmitted to a remotely mounted indicating device and translated thereby into corresponding visual indications.

Another object of this invention is to provide a connecting means between the temperature responsive element and the indicating device which is non-responsive to temperature changes so as not to cause an error in the transmission of the movement of the temperature responsive element when the connecting means is subjected to varying temperature changes different from those to which the temperature responsive element is subjected.

Another object of this invention is to provide rigid spacing means in combination with flexible transmitting means between the thermoresponsive element and the remotely mounted indicator in order to keep the distance between the thermoresponsive element and the indicator fixed at all times and thus prevent any errors in the indications of the indicator which would be caused by an increase or decrease in the distance between the thermoresponsive element and the indicator.

Other objects and attendant advantages will be more readily apparent from the detailed description of one embodiment of the invention which follows, reference being had to the accompanying drawing in which Figure 1 is a sectional view of the temperature responsive member and indicating device associated therewith as it is constructed for use in combination with a particular make of automobile engine.

Figure 1:
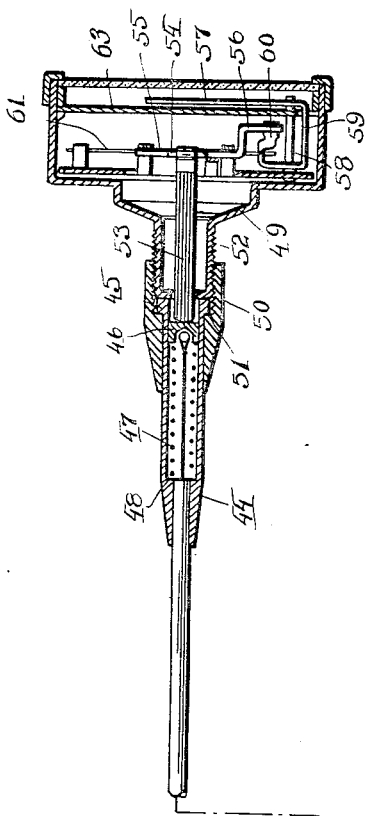
Figure 3:
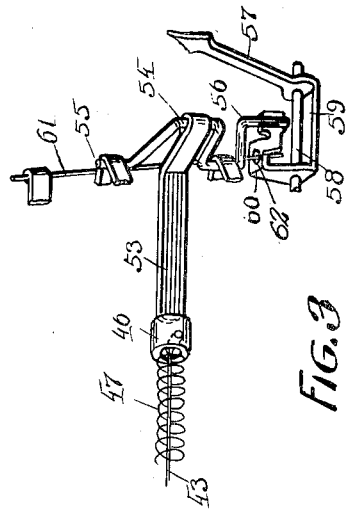
Figure 3 is a diagrammatic perspective view of the indicating device associated with the temperature responsive member.
Figure 2:
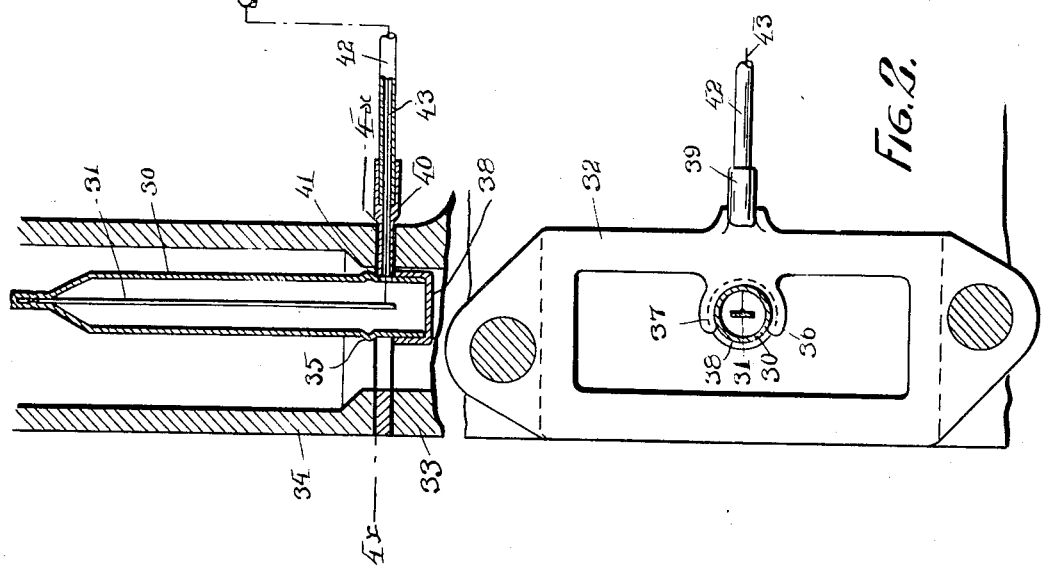
Figure 2 is a horizontal sectional view of the temperature responsive member and its mounting, the section being taken on the line 4x—4x of Figure 1.

The temperature indicating system forming the subject matter of my present invention comprises the combination of a temperature responsive element in the form of a bimetallic strip or its equivalent and an indicating device and means for transmitting the movement of the thermoresponsive element to the indicating device which will not be affected by a change of temperature in order to transmit the movement of the thermoresponsive element more quickly and more accurately to the indicating device than has heretofore been possible.

In the drawing reference numeral 30 indicates a tubular casing in the inner end of which is firmly anchored one end of the thermoresponsive element 31.

The casing 30, is mounted on a metal gasket 32 which is inserted into the joint between the engine block 33 and the pipe connection 34 leading from the engine block to the radiator of the engine. The casing 30 has an annular shoulder 35 formed on the outside near the bottom of it whereby the casing may be temporarily supported in the bifurcation formed by the lugs 36 and 37 which project from one side of the inside of the metal gasket 32. When this is done the lugs 36 and 37 are bent concentrically against the outside wall of the casing 30 and soldered thereto while a cover 38 is suitably fastened to the casing to close the bottom of it and form a shoulder on the casing on the under side of the lugs 36 and 37. In this way the casing is firmly anchored in place within the gasket 32 and projects vertically into the pipe connection 34 where it is exposed to the cooling water passing from the engine block to the radiator.

The gasket 32 has a lug 39 projecting from the outside thereof and this lug is upset to increase the thickness thereof. A hole 40 passes thru the lug 39 and registers with a hole 41 provided in the wall of the casing 30. The hole 40 in the lug 39 is enlarged where it passes thru the upset portion of the lug in order to receive the end of the protecting tube 42 to have it suitably fastened in place therein. The transmission wire 43 enters the hole 40 thru the protecting tube and passes thru the hole 41 into the casing 30 where it is attached to the lower end of the thermoresponsive member 31.

The end of the protecting tube 42, which has the indicator attached thereto, is provided with a sleeve 44 having an annular shoulder 45 surrounding the outer end thereof. Within this sleeve 44 is mounted to slide the sliding member 46 which has attached thereto the end of the transmission wire 43. An expansion spring 47 is placed between the sliding member 46 and a shoulder 48 provided within the sleeve and normally holds the transmission wire under tension between the sliding member 46 at one end and the thermoresponsive element 31 at the other end.

The sleeve 44 is attached to the indicator casing 49 by means of the elongated nut 50. This nut has on the inside a shoulder 51 which engages behind the shoulder 45 of the sleeve 44 so that when the nut 50 is threaded over the threaded nipple 52 of the indicator housing, the end of the sleeve 44 is firmly clamped end to end against the nipple 52.

The movement of the transmission wire 43 is transmitted to the indicator hand by the indicator mechanism which will now be described. This mechanism comprises a sliding member 53, one end of which projects thru a suitable opening in the end of the nipple 52 and is held in contact with the sliding member 46 provided at the end of the transmission wire 43. The opposite end of the sliding member 53 is bent to one side and the outer end of the bent portion of the sliding member is pivoted to a crank 54. This crank is mounted to oscillate in suitable bearings provided therefor and one end of the crank shaft 55, on which the crank 54 is formed, is offset to form a second crank 56 thereon. The pointer 57 of the indicator is pivoted on the fixed pivot pin 58 and has the cradle 59 formed integral therewith to provide suitable bearings for the swinging thereof. The rear portion of the cradle 59 is provided with an extension 60 which forms a flat crank member which is normally held in yielding contact with the crank 56 of the crank shaft 55. For this purpose a light spring finger 61 is provided and engages into the hole 62 in the extension 60 of the cradle of the pointer. The pressure with which the spring finger 61 forces the crank member of the pointer against the crank 56 of the crank shaft is just great enough to yieldingly force the pointer extension against the crank 56 so that the crank shaft 55, with its crank 54, holds the free end of the sliding member 53 yieldingly in contact with the sliding member 46. A continuous contact between the sliding members 46 and 53 is thus provided at all times and when the thermostatic strip flexes and moves the transmission wire 43, the sliding member 53 of the indicator closely follows the movement of the sliding member 46 of the transmission wire and causes the indicator mechanism, above described, to operate and swing the pointer 57 to indicate on the dial 63 the relative temperature in degrees which caused the thermoresponsive member to deflect. The operation of the crank 56 upon the extension 60 of the cradle of the pointer 57 causes the pointer to swing on the pivot pin 58 and indicate the temperature change on the dial 63.

I claim:

1. In a temperature indicating system the combination of a gasket having an opening therein, a casing, means carried by said gasket and projecting into the opening in said gasket and embracing said casing to anchor said casing in the opening in said gasket, a thermoresponsive element mounted within said casing.

2. In a temperature indicating system the combination of a gasket having an opening therein, a casing, means carried by said gasket and projecting into the opening in said gasket and embracing said casing to anchor said casing in the opening in said gasket, a thermoresponsive element mounted within said casing and a transmitting wire connected to said thermoresponsive element for transmitting the movement of said thermoresponsive element thru a hole in said casing and said gasket.

3. In a temperature indicating system the combination of a gasket having an opening therein adapted to form a section of a duct for the passage of liquid cooling means, a thermoresponsive element, a casing surrounding said thermoresponsive element, means carried by said gasket to support said casing in the opening of said gasket in line with the duct of which the opening of the gasket forms a part, and means connected to said thermoresponsive element and passing thru said casing and said gasket to transmit the movement of said thermoresponsive element.

4. In a temperature indicating system the combination of a thermoresponsive element, means for supporting said element within a continuous duct, a transmission wire connected to said thermoresponsive element and passing thru said supporting means, a protective tube connected to said supporting means and having said transmission wire pass therethru, a sliding member in the end of said protective tube with the end of said transmission wire connected thereto and spring means within said protective tube to act on said sliding means and keep said transmission wire taut between said thermoresponsive element and said sliding member.

5. In a temperature indicating system the combination of a thermoresponsive element, means for mounting said thermoresponsive element to one end thereof, a transmission wire communicating with the free end of said thermoresponsive element, a protective tube surrounding said transmission wire, means connected to said transmission wire and carried in the end of said protective tube to keep said transmission wire taut between said means and said thermoresponsive element, an indicating device connected to the end of said protective tube, a second sliding member mounted within said indicating device and means for yieldingly holding said second sliding member in contact with said first sliding member and a pointer operated by said second sliding member on the movement thereof by said first sliding member.

HERBERT HASTINGS.